United States Patent
Maalej et al.

(10) Patent No.: US 12,135,680 B2
(45) Date of Patent: Nov. 5, 2024

(54) DYNAMIC PROCESSOR ARCHITECTURE CONTROL

(71) Applicant: VSORA, Meudon La Foret (FR)

(72) Inventors: Khaled Maalej, Paris (FR); Trung Dung Nguyen, Massy (FR); Julien Schmitt, Massy (FR); Pierre-Emmanuel Bernard, Antony (FR)

(73) Assignee: VSORA, Meudon la Foret (FR)

( * ) Notice: Subject to any disclaimer, the term of this patent is extended or adjusted under 35 U.S.C. 154(b) by 113 days.

(21) Appl. No.: 16/771,376

(22) PCT Filed: Nov. 27, 2018

(86) PCT No.: PCT/FR2018/052995
§ 371 (c)(1),
(2) Date: Jun. 10, 2020

(87) PCT Pub. No.: WO2019/115902
PCT Pub. Date: Jun. 20, 2019

(65) Prior Publication Data
US 2021/0173809 A1 Jun. 10, 2021

(30) Foreign Application Priority Data
Dec. 13, 2017 (FR) .................................. 17 62068

(51) Int. Cl.
*G06F 15/80* (2006.01)
*G06F 8/41* (2018.01)
*G06F 9/445* (2018.01)

(52) U.S. Cl.
CPC .............. *G06F 15/80* (2013.01); *G06F 8/447* (2013.01); *G06F 8/47* (2013.01); *G06F 9/44589* (2013.01)

(58) Field of Classification Search
CPC ........ G06F 8/41; G06F 9/44589; G06F 15/80; G06F 8/47; G06F 8/447; G06F 8/443;
(Continued)

(56) References Cited

U.S. PATENT DOCUMENTS 5,475,856 A 12/1995 Kogge
5,878,241 A * 3/1999 Wilkinson ............ G06F 9/3887
712/E9.055

(Continued)

FOREIGN PATENT DOCUMENTS

| CN | 101124569 A | 2/2008 |
| CN | 104424158 A | 3/2015 |
| CN | 105630728 A | 6/2016 |

OTHER PUBLICATIONS

M. A. Nichols, H. J. Siegel and H. G. Dietz, "Execution mode management and CU/PE overlap in an SIMD/SPMD parallel language/compiler," Proceedings The Fifteenth Annual International Computer Software & Applications Conference, Tokyo, Japan, pp. 392-397 (Year: 1991).*

(Continued)

*Primary Examiner* — Andrew Caldwell
*Assistant Examiner* — Kasim Alli
(74) *Attorney, Agent, or Firm* — Faegre Drinker Biddle & Reath LLP (57) ABSTRACT

A processor comprising a control unit and a plurality of processing units interacting according to an operating architecture imposed dynamically by the control unit from among at least two of the following architectures: a single instruction multiple data (SIMD) stream architecture, a multiple instruction single data (MISD) stream architecture, and a multiple instruction multiple data (MIMD) stream architecture. The operating architecture is imposed dynamically by the control unit according to: configuration functions included in a machine code, and/or data to be processed and current processing instructions received as input of the processor.

6 Claims, 4 Drawing Sheets

(58) Field of Classification Search
CPC ........ G06F 8/433; G06F 8/4441; G06F 8/445; G06F 8/45; G06F 8/456; G06F 9/30036; G06F 9/30076; G06F 9/30189; G06F 9/3885; G06F 9/3887; G06F 9/38873; G06F 9/38875; G06F 9/3888; G06F 9/38885; G06F 9/3889; G06F 9/3891; G06F 9/3893; G06F 9/3895; G06F 9/3897; G06F 15/76; G06F 15/8007; G06F 15/8046

See application file for complete search history.

(56) References Cited

U.S. PATENT DOCUMENTS

| | | | |
|---|---|---|---|
| 5,903,771 A | 5/1999 | Sgro et al. | |
| 5,933,642 A * | 8/1999 | Greenbaum | ........ G06F 9/30134 712/E9.023 |
| 8,099,777 B1 | 1/2012 | Maxted | |
| 8,156,474 B2 * | 4/2012 | Teplitsky | ............ G06F 11/3684 717/124 |
| 8,447,953 B2 | 5/2013 | Wildman | |
| 2009/0282223 A1 | 11/2009 | Lyuh et al. | |
| 2014/0281407 A1 * | 9/2014 | Astigeyevich | ............ G06F 8/45 712/216 |
| 2016/0147515 A1 | 5/2016 | Kim et al. | |
| 2016/0210154 A1 | 7/2016 | Lin | |
| 2016/0291949 A1 * | 10/2016 | Mineda | .................. G06F 8/456 |
| 2019/0138313 A1 | 5/2019 | Lin | |

OTHER PUBLICATIONS

Second Office Action issued in related application CN 201880080771.2, Mar. 1, 2024, with English language translation, 21 pages.

* cited by examiner

DYNAMIC PROCESSOR ARCHITECTURE CONTROL

CROSS-REFERENCE TO RELATED APPLICATIONS

This application is the U.S. national phase of the International patent Application No. PCT/FR2018/052995 filed Nov. 27, 2018, which claims the benefit of French Application No. 17 62068 filed Dec. 13, 2017, the entire content of which is incorporated herein by reference.

FIELD

The disclosure falls within the field of processors, in particular the intrinsic operation thereof.

BACKGROUND

Conventionally, processors have an architecture defined in the design thereof. The architecture is at least partly defined by the implementation of a set of machine instructions that the processor can execute (ISA, for "Instruction Set Architecture"). It is generally accepted that each known structure can be classified in one of the following types (or classes), defined according to Flynn's taxonomy:
  single instruction single data, or SISD;
  single instruction multiple data, or SIMD;
  multiple instruction single data, or MISD;
  multiple instruction multiple data, or MIMD.

Each of these types of architecture has known advantages and disadvantages. The level of parallelism between the computations differs according to the planned applications. The choice of one architecture generally renders the processor on which it is implemented particularly efficient (fast) for certain computations and slow for others. The selection of the processor type involves trade-offs in the use of the processor. Each processor type tends to be specialized in certain computations to the detriment of other computations for which it is less efficient.

The disclosed embodiments improve the situation.

SUMMARY

A processor is proposed comprising a control unit and a plurality of processing units. The processing units interact according to an operating architecture imposed dynamically by the control unit from among at least two of the following architectures:
  a single instruction multiple data (SIMD) stream architecture,
  a multiple instruction single data (MISD) stream architecture,
  a multiple instruction multiple data (MIMD) stream architecture.
The operating architecture being imposed dynamically by the control unit according to:
  configuration functions included in a machine code, and/or
  data to be processed and current processing instructions received as input for the processor.

Such a processor allows for a dynamic and contextual adaptation in its internal operation. When the computations to be performed are independent of one another, they can be processed in parallel, therefore at the same time, by mutually distinct computation units. The processing of all the computations is accelerated. When the computations to be performed are dependent on one another, then parallel processing is not suitable. The recursive computations are an example of computations ill-suited to parallel processing: to perform a computation, the result of a preceding computation is necessary. One or more computation units must execute computations sequentially, one cycle after the other. Such a processor is multipurpose. Such a processor has an architecture that varies during the execution of the computations according to the computations themselves.

According to another aspect, a method for compiling a source code is proposed that is implemented by computing means, comprising the following steps:
  receiving a source code as input,
  searching in the source code:
    for configuration data imposing an operating architecture of a processor,
    for first parts of the source code corresponding to data processing instructions including cascaded sequences of elementary operations, and
    for second parts of the source code corresponding to data processing instructions including mutually independent elementary operations.
The method further comprises the following step:
  compiling the source code into a machine code.

In the case where at least one configuration datum imposing an operating architecture of a processor has been identified and/or in the case where at least one first part of the source code and at least one second part of the source code have been identified, the compilation comprises the inclusion in the machine code of configuration functions. The configuration functions are arranged to dynamically impose on a processor executing the machine code an architecture from among at least two of the following architectures:
  a single instruction multiple data (SIMD) stream architecture,
  a multiple instruction single data (MISD) stream architecture,
  a multiple instruction multiple data (MIMD) stream architecture.

Optionally, the method for compiling a source code further comprises the verification of the observance of a set of rules pre-established in the input processing instructions, the configuration functions included in the machine code during compilation being also selected according to the observance or the non-observance of said rules.

According to another aspect, a method for managing the architecture of a processor is proposed, implemented by computing means, comprising the following steps:
  receiving data to be processed and processing instructions as input for the processor, and
  dynamically imposing on at least one processing unit of the processor an operating architecture according to said data to be processed and the processing instructions received, the operating architectures being selected from among at least two of the following architectures:
    a single instruction multiple data (SIMD) stream architecture,
    a multiple instruction single data (MISD) stream architecture,
    a multiple instruction multiple data (MIMD) stream architecture.

According to yet another aspect, a computer-readable non-transient storage medium is proposed on which is stored a compilation program comprising instructions for implementing the above method. According to yet another aspect, a compilation computer program is proposed comprising instructions for implementing the compilation method, when this program is run by a processor.

According to yet another aspect, a non-transient storage medium that can be read by a control unit of a processor is proposed on which is stored a set of machine instructions for implementing a method for managing architectures such as those defined herein. According to yet another aspect, a machine instruction set is proposed for implementing the architecture management method, when this machine instruction set is executed by the control unit of a processor.

BRIEF DESCRIPTION OF THE DRAWINGS

Other features, details and advantages will become apparent on reading the following detailed description, and on analyzing the attached drawings, in which.

DETAILED DESCRIPTION

The drawings and the description hereinbelow contain, for the most part, elements of a certain nature. They can therefore not only be used to better understand the disclosed embodiments, but also contribute to the definition thereof, as appropriate.

Figure 1:
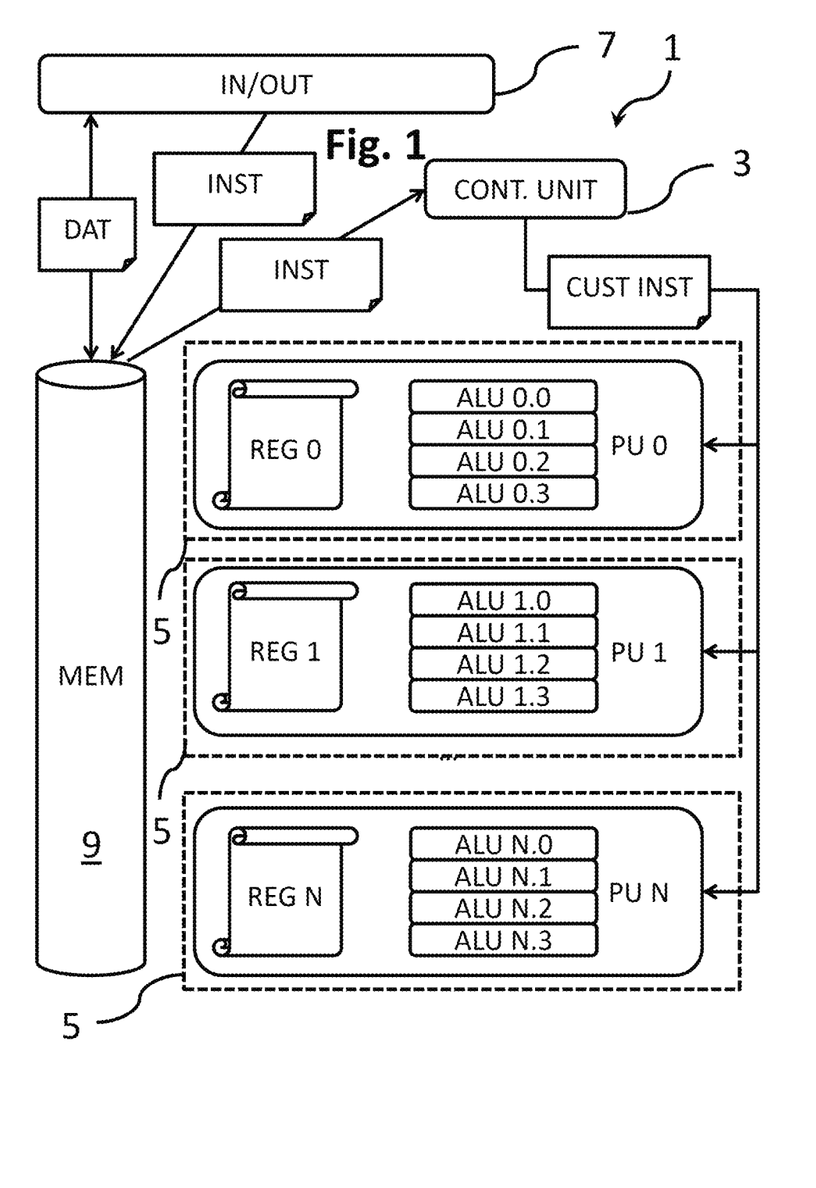
FIG. 1 partially shows an architecture of a processor according to an embodiment.

FIG. 1 shows a processor 1, sometimes called central processing unit or CPU. The processor 1 comprises:
 a control unit 3,
 a computation part including a plurality of processing units 5,
 an input-output unit 7, or interface, and
 a memory unit 9.

As is known per se, the processor 1 receives, via the input-output unit 7, data to be processed ("data") and processing instructions ("instructions"). The data and instructions are stored in the memory unit 9. The memory unit 9 can be divided into several parts. For example, the memory unit 9 comprises a data part (or "Data pool") and an instruction part (or "Instruction pool").

Each processing unit 5 performs the computations on the data and according to instructions taken from those stored in the memory unit 9. The control unit 3 imposes, on each processing unit 5, the manner in which the elementary computations should be performed, notably their order, and assigns to each computation member of the processing unit 5 the operations to be executed.

In the examples described here, each processing unit 5, or PU, comprises several computation members: the arithmetic and logic units, or ALU. Each processing unit 5 comprises at least one ALU and at least one associated set of registers REG. Hereinafter and in accordance with the Figures, each processing unit 5 is numbered from PU 0 to PU N. Each ALU is numbered A.B, in which "A" identifies the processing unit PU A to which the ALU belongs and "B" is an identifier of the ALU out of the other ALUs of the processing unit PU A.

Figure 2:
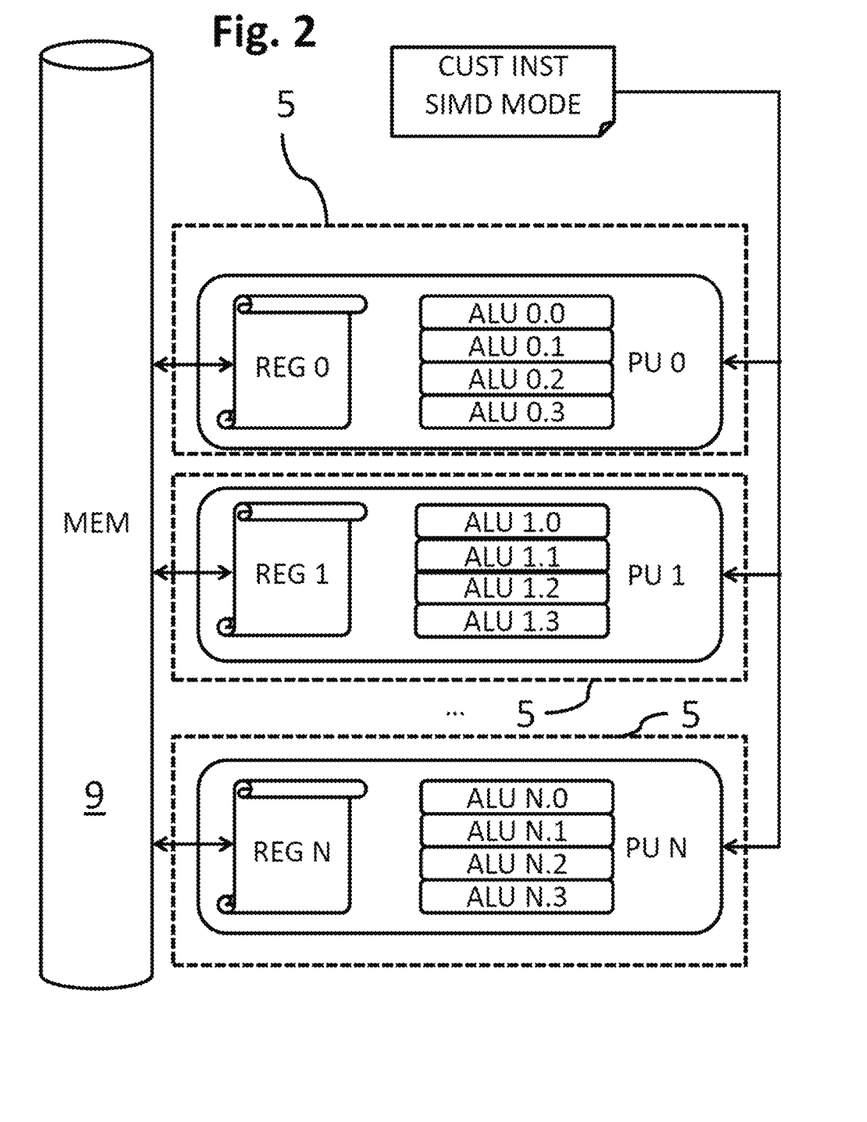
FIG. 2 shows a mode of operation of a processor according to an embodiment.
Figure 3:
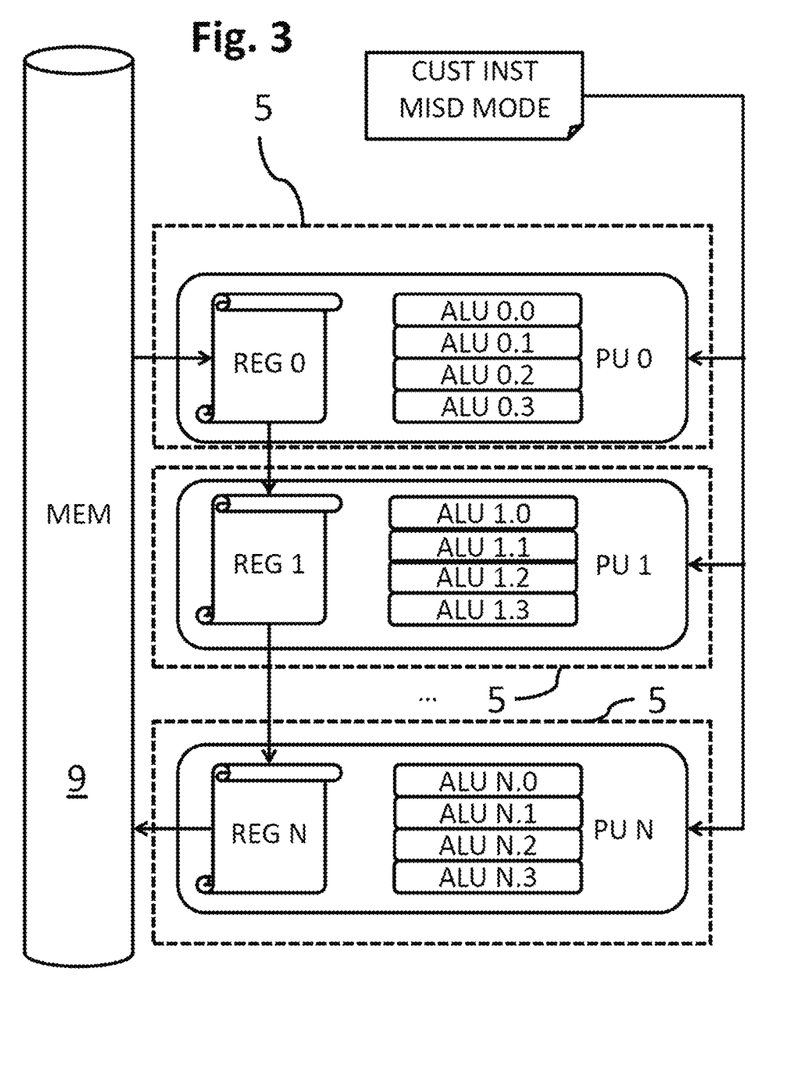
FIG. 3 shows a mode of operation of a processor according to an embodiment.

The processor 1 comprises at least two ALUs divided up into two processing units 5. For example, each processing unit 5 comprises a single ALU or a plurality of ALUs. In the examples of FIGS. 1 to 3, each processing unit 5 comprises four ALUs numbered 0 to 3. When a processing unit 5 comprises a plurality of ALUs, the processing unit 5 is said to be multicore.

Each ALU can perform:
 arithmetic operations on integer data (addition, subtraction, multiplication, division, etc.);
 arithmetic operations on floating data (addition, subtraction, multiplication, division, inversion, square root, logarithms, trigonometry, etc.);
 logic operations (twos complements, "AND", "OR", "exclusive OR", etc.).

The processing units 5 and the memory unit 9 interact according to one and/or the other of the following three architectures:
 a single instruction multiple data (SIMD) stream architecture,
 a multiple instruction single data (MISD) stream architecture,
 a multiple instruction multiple data (MIMD) stream architecture.

An example of an SIMD architecture is represented in FIG. 2. In this example, the processing units 5 interact according to the SIMD architecture. The data to be processed are copied (loaded) from the memory unit 9 onto each of the sets of registers REG 0, REG 1, . . . , REG N of the corresponding processing unit 5. The ALUs perform the computations. The results are written into the set of registers REG 0, REG 1, . . . , REG N. Then, the results are copied from the sets of registers REG 0, REG 1, . . . , REG N into the memory unit 9.

In this example, the processing units 5 do not directly exchange data with one another. The ALUs of each processing unit 5 process the data and perform computations independently from one processing unit 5 to another. The operation of the processor 1 is parallelized at the processing unit 5 level.

In the example of FIG. 2, the interactions between the ALUs are not represented. Thus, while the processing units 5 interact with one another according to an SIMD architecture, the ALUs of one and the same processing unit interact according to the SIMD architecture, as is described hereinbelow with respect to FIG. 4.

An example of the MISD architecture is represented in FIG. 3. In this example, the processing units 5 interact according to the MISD architecture. The data are copied (loaded) from the memory unit 9 onto the set of registers of a single processing unit 5, here the set of registers REG 0 of the processing unit PU 0. The ALUs 0.0, 0.1, 0.2 and 0.3 perform computations. The results are written into the set of registers REG 0. Then, the results are copied from the set of registers REG 0 onto a set of registers of another processing unit 5, here onto the set of registers REG 1 of the processing unit PU 1. In turn, the ALUs 1.0, 1.1, 1.2 and 1.3 perform computations and the results ae written into the set of registers REG 1. These operations are reproduced one after the other by each of the processing units 5 until the results are written into the set of registers of the last processing unit 5, i.e. here, the set of registers REG N of the processing unit PU N. Then, the results are copied from the last set of registers REG N into the memory unit 9.

In this example, the processing units 5 directly exchange data with one another. The ALUs of each processing unit 5 perform computations on data which are themselves results of computations implemented by the other processing units 5. The operation of the processor 1 is not parallelized at the processing unit 5 level. On the contrary, the processing units 5 exhibit a serial, or cascaded, operation. This type of operation is for example suited to the so-called recursive computations. The operations implemented by the processing units 5 can be the same but are applied to data which are, each time, different. As a variant, the instructions could also be different from one another and the data could also be different from one another.

In the example of FIG. 3, as in that of FIG. 2, the interactions between the ALUs are not represented.

Figure 4:
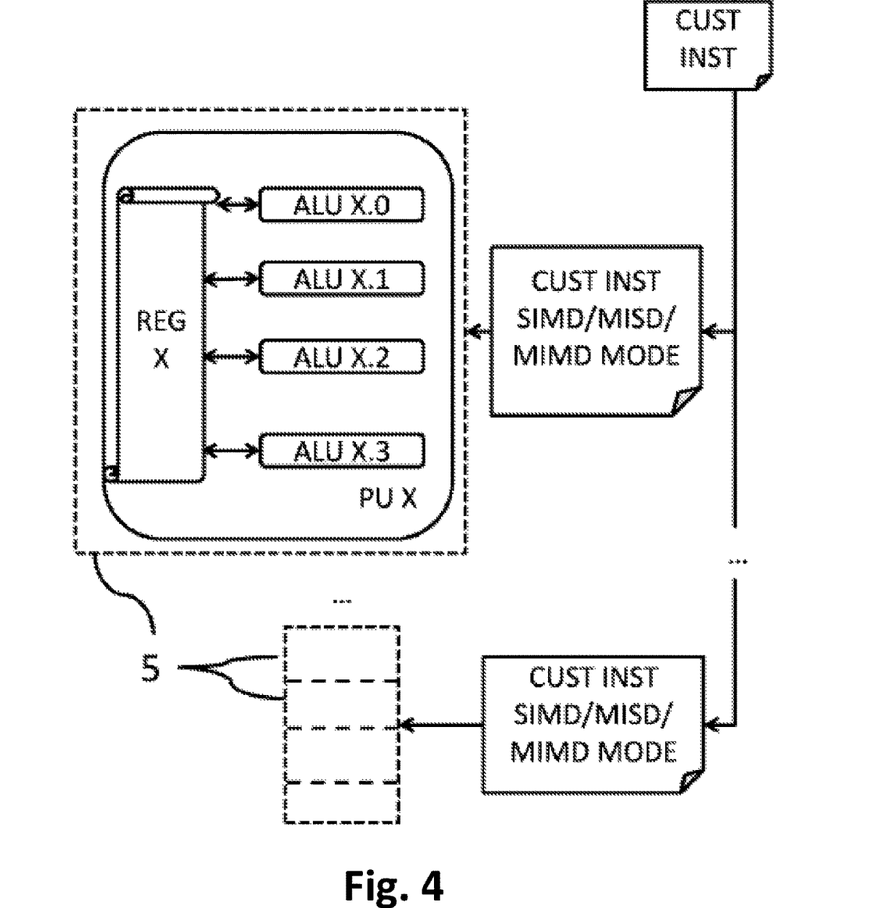
FIG. 4 shows a detail of operation of a processor according to an embodiment.

In FIG. 4, the operations of two PUs are represented.

The processing unit PU X comprises four ALUs. The ALUs of the processing unit PU X interact with one another. The data are loaded from the set of registers REG X onto each of the ALUs X.0, X.1, X.2, X.3 of the processing unit PU X. The ALUs perform the computations. The results are then written into the set of registers REG X.

The ALUs do not directly exchange data with one another.

In the example of FIG. 4, the architectures at the processing unit 5 level are not represented. Thus, the processing units 5 can interact according to one and/or the other of the SIMD, MISD and MIMD architectures, as is described above with respect to FIGS. 2 and 3. In other words, the example of PU X is compatible with the example of FIG. 2 and with the example of FIG. 3.

Figure 5:
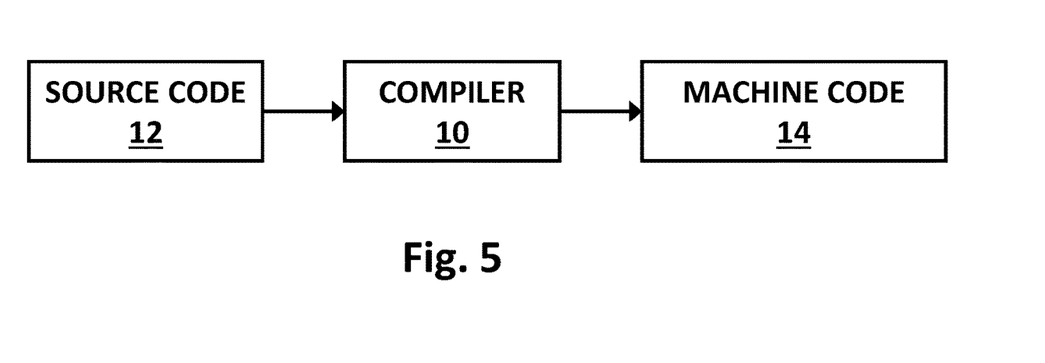
FIG. 5 shows a compiler receiving source code and generating machine code.

The operating architectures can be imposed dynamically by the control unit 3 according to the data to be processed and the current instructions received as input for the processor 1. Such a dynamic adaptation of the architectures can be implemented from the compilation stage, by adapting the machine instructions 14 generated by the compiler 10 as a function of the type of data to be processed and of the instructions when the type of data to be processed and the instructions can be deduced from the source code 12. Such an adaptation can also be implemented solely at the processor level when it executes a conventional machine code when this processor is programed to implement a set of configuration instructions that is a function of the data to be processed and of the current instructions received.

An example of computer code of the computations to be performed is reproduced below. This code extract corresponds for example to instructions of a source code to be implemented by the processor 1.

```
void processing( )
{
  matrix A(4,4);
  matrix B(4,4);
  matrix C(4,4);
  C = A * B; // (1)
  C = C + B; // (2)
  matrix D (4,4);
  D = inv(A); // (3)
}
```

In the example, the processor comprises four processing units PU, each processing unit PU comprises four arithmetic and logic units ALU. In the example, the matrix multiplication is processed first while the matrix addition is processed second. The compiler is capable of processing matrix operations by breaking them down into elementary operations. For each matrix operation, the elementary operations of which it is composed are independent of one another. In other words, the result of one elementary operation is useless for implementing another elementary operation. The elementary operations can therefore be implemented in parallel with one another. The addition of two matrices of 4 by 4 dimensions requires 16 elementary operations (addition). This matrix addition, i.e. the 16 elementary operations, can be executed in a single cycle. The multiplication of the two matrices of 4 by 4 dimensions requires 64 elementary operations (multiplication+accumulation). This matrix multiplication, i.e. the 64 elementary operations, are therefore executed at the very least in four cycles.

The operation referenced "(3)" (matrix inversion) comprises elementary operations that are dependent on one another. The results of some elementary operations are necessary to the implementation of other elementary operations. A parallel processing is unsuitable. The inversion algorithm must therefore be broken down into N processing steps. Each step can be performed on one ALU in one cycle, but with data distinct from one another and processes distinct from one another.

step_1→step_2→step_3→step_4→step_5→ . . . →step_N

For the implementation of the operations "(1)" and "(2)", the processor 1 adopts an SIMD architecture. For the implementation of the operation "(3)", the processor 1 adopts an MISD architecture.

For example the operation "(3)" comprises nine steps (N=9). Three iterations, or three cycles, are therefore necessary. Each cycle is implemented by a processing unit PU. The assignment of the N steps of a cycle to the ALUs of the processing unit PU is done, for example, as follows:

Cycle 1:
ALU 0→step_1
ALU 1→step_2
ALU 2→step_3
ALU 3→step_4
Cycle 2:
ALU 0→step_5
ALU 1→step_6
ALU 2→step_7
ALU 3→step_8
Cycle 3:
ALU 0→step_9

During the cycle 3, the ALU 1, ALU 2 and ALU 3 are not used.

As indicated previously, the operating architectures can be imposed dynamically by the control unit 3 according to the data and current instructions received as input for the processor 1. That covers two cases.

In a first case, the architecture and the assignment of the resources are fixed during compilation. In other words, a developer of a third-party program (other than those governing the intrinsic operation of the processor) can include in the source code specific configuration instructions. The specific instructions are transcribed into target language (during compilation) in specific instructions (machine code) recognized by the control unit 3. On reception, on the processor 1, the control unit 3 imposes architectures on the processing units 5 in a way that is predefined by the instructions. In this case, the responsibility for optimizing the operation of the processor can be left to the creator of the third-party program. Based on said program, the programmer is free to impose or not impose a particular operation of the processor, that is to say, here, an architecture chosen from among SISD, MISD, MIMD or a combination thereof.

In a second case, the architecture and the assignment of the resources are fixed in a preestablished manner according to a set of machine instructions implemented in the processor. Such an instruction set is generally implemented before marketing and use of the processor. The machine instructions set is not intended to be modified by the users of the processor. In this second case, on receipt of the instructions on the processor 1, the control unit 3 implements an architecture management, or architecture configuration, method, prior to the implementation of the instructions received as input. For example, the control unit 3 first transmits to each processing unit PU configuration data specific to each processing unit PU. Each of the sets of configuration data is stored in a configuration register that is accessible to the corresponding processing unit. Next, the processing units PU receive generic processing instructions (common to all the PUs) from an instruction bus. Each PU implements the processing instructions in a way which varies according to the configuration data previously received and stored in the configuration register. In other words, each PU interprets the generic processing instructions by means of the configuration data to adapt the processing to be implemented. The second case makes it possible to introduce flexibility into the control. Generic instructions can be transmitted to all the PUs, whatever the architecture to be adopted (SIMD, MISD, MIMD). The prior transmission of the configuration data makes it possible to select the architecture actually adopted by the PUs on receipt of the generic instructions.

In both cases, the architectures can be dynamic, that is to say evolve in the course of the steps of execution of the instructions received, notably according to the nature of the computations to be performed. For example, an SIMD architecture can be imposed by default and an MISD architecture can be imposed for the recursive computations. The two cases are compatible: the processor 1 can be arranged to implement an architectures management method according to specific configuration instructions received (contained in the machine code deriving from the compilation) and to implement an architectures management method according to a set of machine instructions in the absence or as a complement to specific configuration instructions from among the instructions received as input.

According to another point of view, it can be considered that, by implementing configuration instructions intended to adapt the architecture of the processor 1 on the fly, the control unit 3 transforms the processing instructions received normally as input into adapted instructions or "macro-instructions" (or "custom instructions"). The adapted instructions contain both processing instructions and configuration instructions. When the adapted instructions transmitted to each of the processing units 5 are all identical, the processor operates in SIMD mode. The processing units 5 all perform the same operations on different data to be processed. When the adapted instructions transmitted to each of the processing units 5 are different from one another, the processor operates in MISD or MIMD mode. The processing units 5 perform operations that are distinct from one another on data to be processed that are identical (MISD) or different (MIMD).

A second example of computer code of computations to be performed is reproduced hereinbelow:

```
void processing( )
{
matrix A(4,4) [2];
matrix D (4,4) [2];
D = inv(A); // (3)
}
```

The example defines an array of matrices, each matrix being of 4 by 4 dimension, the array being of size 2 (comprising two matrices). The function denoted "inv" on an array of matrices consists in inverting each element of the array, that is to say inverting each of the two matrices of 4 by 4 dimension. As in the preceding example, the processor comprises four ALUs.

This assignment of the N steps to the ALUs is done, for example, as follows:
cycle 1: steps 1 to 4 for the matrix A[0];
cycle 2: steps 1 to 4 for the matrix A[1];
cycle 3: steps 5 to 8 for the matrix A[0];
cycle 4: steps 5 to 8 for the matrix A[1];
cycle 5: step 9 for the matrix A[0];
cycle 6: step 9 for the matrix A[1].

It is also possible to optimize the execution of the "inv" function by grouping together the cycles 5 and 6 in a common cycle. Thus, a single PU is necessary to implement the step 9 on two matrices. As a variant, the ALU 0 can be assigned to the computations relating to the matrix A[0] while the ALU 1 is assigned to the computations relating to the matrix A[1].

The assignment of each ALU to operations can be planned from compilation if at least some of the data is known at that stage, notably the size of the matrices and the size of the array. The assignment can be done dynamically. For example, the assignment can be imposed by the control unit 3 according to a set of machine instructions implemented on the processor 1. In this case, the set of machine instructions is stored on a non-transient storage medium (for example a part of the memory unit 9) that can be read by the control unit 3 to implement a method for managing the architecture of the processor 1.

For example, the control unit 3 is arranged to impose on a processing unit 5 the implementation of a first set of operations by all of the ALUs, then the first set of operations is reiterated on each of the elements of the array (each of the matrices in the preceding example). Next, the number of operations that can be performed in parallel (not interdependent) is estimated. For example, the number of resources (the number of ALUs) is divided by the number of operations to be implemented. Finally, the assignment of the operations to each ALU is performed in such a way that at least some of the operations are performed in parallel with one another by distinct ALUs of distinct processing units 5.

Thus, the architecture of the processing units 5 can vary over time. During a processing operation, the architecture of the processing units 5 can alternate between SIMD, MISD and MIMD.

The disclosure is not limited to the examples of processors described above, purely by way of example, but it encompasses all the variants that the person skilled in the art can envisage in the context of the protection sought. The disclosure relates also to a machine instruction set that can be implemented in a processor to obtain such a processor, the implementation of such a machine instruction set on a processor, the processor architecture management method implemented by the processor, the computer program comprising the corresponding machine instructions set, and the storage medium on which such a machine instructions set is electronically stored.

The invention claimed is:

1. A method for compiling a source code comprising the following steps:
   receiving the source code as input,
   searching in the source code:
      for configuration data imposing an operating architecture of a processor,
      for first parts of the source code corresponding to data processing instructions including cascaded sequences of elementary operations, and for second parts of the source code corresponding to data processing instructions including elementary operations that are independent of one another, the method further comprising the following step:

compiling the source code into a machine code,
- in a first case where at least one configuration datum imposing the operating architecture of the processor has been identified, and
- in a second case where the first parts of the source code and the second parts of the source code have been identified, wherein the compiling of the source code into the machine code comprises generating the machine code to include a configuration function based on the second case, said configuration function being arranged to dynamically impose on processing units within the processor executing the machine code an architecture adaptation:
  - from a single instruction multiple data (SIMD) stream architecture where the processing units within the processor are dynamically configured for the elementary operations that are independent of one another to not directly exchange data, to a multiple instruction single data (MISD) stream architecture for the cascaded sequences of elementary operations where processed data from a first processing unit of the processing units within the processor is copied to a second processing unit of the processing units within the processor, or
  - from the MISD stream architecture to the SIMD stream architecture.

2. The method as claimed in claim 1, further comprising a verification of observance of a set of rules pre-established in input processing instructions, said configuration functions included in the machine code during compiling being also selected as a function of the observance or of a non-observance of said rules.

3. A computer-readable non-transient storage medium on which is stored a compilation program comprising instructions for implementing the method as claimed in claim 1.

4. The method as claimed in claim 1, wherein:
the operating architecture and an assignment of resources within the processing units are fixed in a preestablished manner according to a set of machine instructions implemented in the processor by respective configuration data specific to each processing unit within the processor,
the processing units within the processor receive generic processing instructions which are common to all the processing units of the processor, and
each processing unit within the processor implements the generic processing instructions in a way which varies according to the respective configuration data previously received.

5. The method as claimed in claim 1, wherein:
the processing units within the processor receive configuration data specific to each processing unit,
the processing units within the processor receive generic processing instructions which are common to all the processing units,
each processing unit within the processor implements the generic processing instructions in a way which varies according to the configuration data previously received.

6. The method as claimed in claim 1, wherein:
the operating architectures are dynamic and evolve according to the source code,
and the processor is arranged:
- to implement an architectures management method according to specific configuration instructions received and contained in the machine code deriving from the compilation of the source code into the machine code,
- and to implement an architectures management method according to a set of machine instructions in an absence of or as a complement to the configuration data imposing the operating architecture.

* * * * *

UNITED STATES PATENT AND TRADEMARK OFFICE
CERTIFICATE OF CORRECTION

| | |
|---|---|
| PATENT NO. | : 12,135,680 B2 |
| APPLICATION NO. | : 16/771376 |
| DATED | : November 5, 2024 |
| INVENTOR(S) | : Khaled Maalej et al. |

Page 1 of 1

It is certified that error appears in the above-identified patent and that said Letters Patent is hereby corrected as shown below:

In the Claims

In Claim 1, Column 9, Lines 14-16, replace:
"to dynamically impose on processing units within the processor executing the machine code an architecture adaptation"
With:
-- to dynamically impose on processing units within the processor an architecture adaptation --

In Claim 4, Column 10, Lines 13-14, replace:
"according to the respective configuration data previously received"
With:
-- according to the respective configuration data --

Signed and Sealed this
Eleventh Day of February, 2025

Coke Morgan Stewart
*Acting Director of the United States Patent and Trademark Office*